(12) United States Patent
Van der Ende

(10) Patent No.: US 9,086,117 B2
(45) Date of Patent: Jul. 21, 2015

(54) ELONGATE MEMBER TERMINATION

(75) Inventor: Andre Martin Van der Ende, Udny Green (GB)

(73) Assignee: Paradigm Oilfield Technologies, B.V., Groot-Ammers (NL)

( * ) Notice: Subject to any disclaimer, the term of this patent is extended or adjusted under 35 U.S.C. 154(b) by 336 days.

(21) Appl. No.: 13/505,062

(22) PCT Filed: Oct. 28, 2010

(86) PCT No.: PCT/GB2010/002004
§ 371 (c)(1),
(2), (4) Date: Jun. 12, 2012

(87) PCT Pub. No.: WO2011/051678
PCT Pub. Date: May 5, 2011

(65) Prior Publication Data
US 2012/0240365 A1    Sep. 27, 2012

(30) Foreign Application Priority Data
Oct. 28, 2009   (GB) .................................. 0918891.3

(51) Int. Cl.
*F16G 11/00*   (2006.01)
*F16G 11/04*   (2006.01)
*E21B 19/12*   (2006.01)

(52) U.S. Cl.
CPC ................ *F16G 11/04* (2013.01); *E21B 19/12* (2013.01); *Y10T 24/3969* (2015.01); *Y10T 24/44017* (2015.01)

(58) Field of Classification Search
USPC ......... 24/122.3, 122.6, 136 R, 136 L, 115 M, 24/115 H, 115 K
See application file for complete search history.

(56) References Cited

U.S. PATENT DOCUMENTS

| | | | |
|---|---|---|---|
| 1,495,258 A | 5/1924 | Duty | |
| 3,163,902 A | 1/1965 | Bernburg et al. | |
| 3,351,986 A | 11/1967 | Johnson | |
| 3,952,377 A | 4/1976 | Morell | |
| 4,845,814 A | 7/1989 | Crook | |
| 2010/0158457 A1* | 6/2010 | Drozd et al. | 385/113 |

FOREIGN PATENT DOCUMENTS

| | | |
|---|---|---|
| DE | 644847 C | 5/1937 |
| FR | 2727378 A1 | 5/1996 |
| GB | 994463 | 6/1965 |

OTHER PUBLICATIONS

International Search Report, 4 pages Dated Aug. 4, 2011.

* cited by examiner

*Primary Examiner* — Jack W Lavinder
(74) *Attorney, Agent, or Firm* — Dickinson Wright PLLC

(57) ABSTRACT

A termination for a circular cross section elongate member comprises a gripping member defining a non-circular passage for receiving a portion of an elongate member. The gripping member is configurable to reduce a dimension of the passage and clamp the portion of the elongate member within the gripping member.

11 Claims, 3 Drawing Sheets

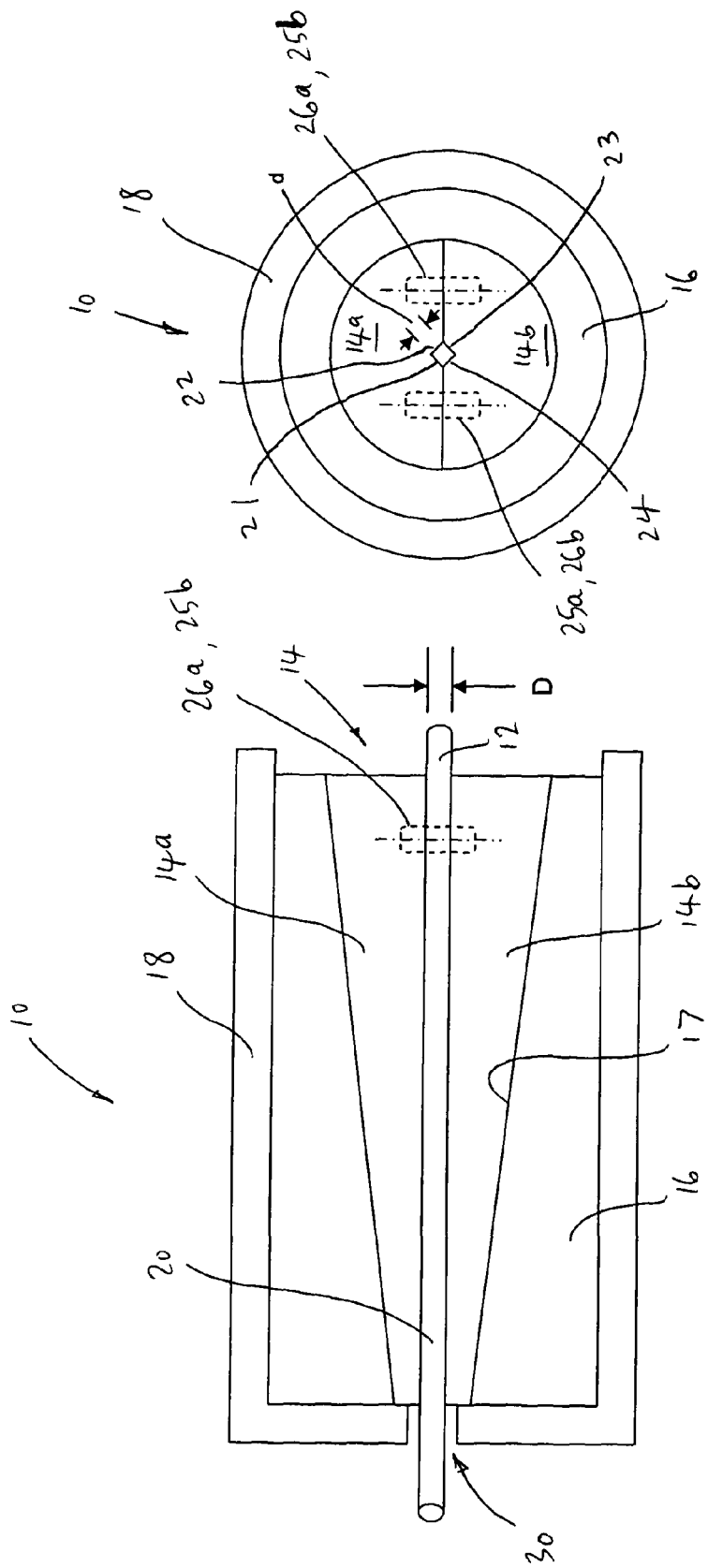

US 9,086,117 B2

ELONGATE MEMBER TERMINATION

CROSS REFERENCE TO RELATED APPLICATION

This application is a National Stage of International Application No. PCT/GB2010/002004 filed Oct. 28, 2010, which claims priority to application number 0918891.3 of Great Britain filed Oct. 28, 2009. The entire disclosure of the above applications are incorporated herein by reference.

FIELD OF THE INVENTION

This invention relates to a termination for an elongate member, in particular an elongate member used to support a tool or device in a downhole environment.

BACKGROUND OF THE INVENTION

In the oil and gas exploration and production industry, reelable support members, such as slickline and wireline, are in common use to run tools and devices into wellbores. Traditionally, slickline and wireline are formed from metallic wire. To terminate a conventional slickline or wireline the end or tail of the member will typically be passed through an opening into a tapered passage in a block, around a wedge and then back through the opening. The wedge is then drawn into the tapered passage, such that the tail of the member is trapped between the sides of the wedge and the block. The block may be coupled to a tool or device. This form of termination requires the member to be capable of defining a relatively small radius of curvature without damage.

Alternatively, metal-based support members may be terminated in sockets using molten metal, although such methods may not permitted in hazardous areas.

There have been numerous proposals for reelable support members comprising non-metallic materials, for example carbon fibres set in an epoxy matrix. Generally, such supports would be damaged if forced to assume the degree of curvature necessary to terminate the member using a conventional wedge and block arrangement, and are not be suitable for termination using molten materials.

SUMMARY OF THE INVENTION

According to the present invention there is provided a termination for a substantially circular cross section elongate member, the termination comprising a gripping member defining a non-circular cross section passage for receiving a portion of an elongate member, the gripping member being configurable to reduce a dimension of the passage and clamp the portion of the elongate member therein.

Another aspect of the present invention relates to a method of terminating an elongate support member, the method comprising:

locating a portion of a substantially circular cross section elongate member in a non-circular passage extending through a gripping member; and configuring the gripping member to reduce a dimension of the passage and clamp said portion of the elongate member in the passage.

In use, the elongate member may be subject to varying tension and may tend to extend longitudinally. This longitudinal extension may be associated with a reduction in transverse cross section of the member, and the termination may be configured to accommodate such a reduction in cross section while maintaining an appropriate grip on the elongate member.

The passage may be polygonal, and in one embodiment is rectangular or square.

The surface of the passage may be relatively smooth, or may be roughened, patterned or otherwise formed to increase the friction coefficient between the passage and the elongate member.

The passage may be configured to define a clamping dimension in which the distance between opposing faces of the passage is smaller than the diameter of the elongate member.

The passage may extend substantially longitudinally of the gripping member, and may extend along a central axis of the member.

The passage may be of a constant cross section, or the cross section of the passage may vary along the length of the passage.

The gripping member may be a unitary member, for example a split ring or sleeve.

Alternatively, the gripping member may be in two or more parts. The gripping member may comprise two or more parts, each part having one or more features configured to inter-engage one or more complementary features formed in one or more of the other parts. Such an arrangement of complementary features may permit separation of the parts to allow the elongate member to be placed in the passage and may serve to align the parts when placed together.

In at least one embodiment, the gripping member may comprise two or more parts, each part comprising one or more protrusions, such as dowel pins configured to inter-engage one or more sockets formed in one or more of the other parts.

In at least one embodiment the gripping member may be in two parts. Each part may have one or more features configured to inter-engage one or more complementary features formed in the other part.

The gripping member may comprise two cone halves. Each of the cone halves may comprise a respective protrusion, such as a dowel pin which is configured to engage a respective socket formed in the other cone half.

The cone halves may define a square-section passage, each half having two mutually perpendicular faces defining two sides of the passage. When the cone halves are placed directly together, the opposing faces are spaced apart by a distance d which is 70-95% of the outer diameter D of the member, and may be 75-85% of the diameter D. The perimeter of the passage may be substantially equal to the circumference of the member.

The gripping member may be configured to be received by an outer member, the gripping member and the outer member being configured such that location of the gripping member in the outer member tends to cause the dimension of the passage to reduce. The gripping member and the outer member may define cooperating frusto-conical surfaces.

The gripping member may comprise two cone halves and the outer member may comprise a sleeve.

The gripping member and the outer member may be located within a housing.

The termination may be provided in combination with a substantially circular cross section elongate member. The elongate member may be utilised to support tools or devices downhole, or may be an umbilical or support member for a subsea unit.

According to a further aspect of the present invention there is provided a termination for an elongate member, the termination comprising a gripping member defining a passage of a first cross section for receiving a portion of an elongate member of a different second cross section, the gripping member being configurable to reduce a dimension of the passage and deform the portion of the elongate member therein.

A still further aspect of the present invention relates to a method of terminating an elongate support member, the method comprising:

locating a portion of an elongate member in a passage extending through a gripping member; and configuring the gripping member to reduce a dimension of the passage and deform said portion of the elongate member in the passage to assume a cross section similar to the cross section of the passage.

BRIEF DESCRIPTION OF THE DRAWINGS

These and other aspects of the invention will now be described, by way of example, with reference to the accompanying drawings, in which:

FIG. 1 is a sectional view of a termination in accordance with an embodiment of the present invention;

FIG. 2 is an end view of the termination of FIG. 1;

DETAILED DESCRIPTION OF THE DRAWINGS

Reference is first made to FIG. 1 of the drawings, a sectional view of a termination 10 in accordance with an embodiment of the present invention. The termination 10 is configured to be secured to the end of an elongate support member 12. The support member 12 will typically be in the form of slickline and wireline as used on the oil and gas industry. However, unlike conventional slickline and wireline, which is predominantly metallic and metal wire based, the member 12 primarily comprises non-metallic fibres set in a compliant matrix. For example, the member 12 may comprise aramid fibres set in a thermoplastic matrix and having an abrasion resistant outer coating, which outer coating is also compliant.

Figure 3:
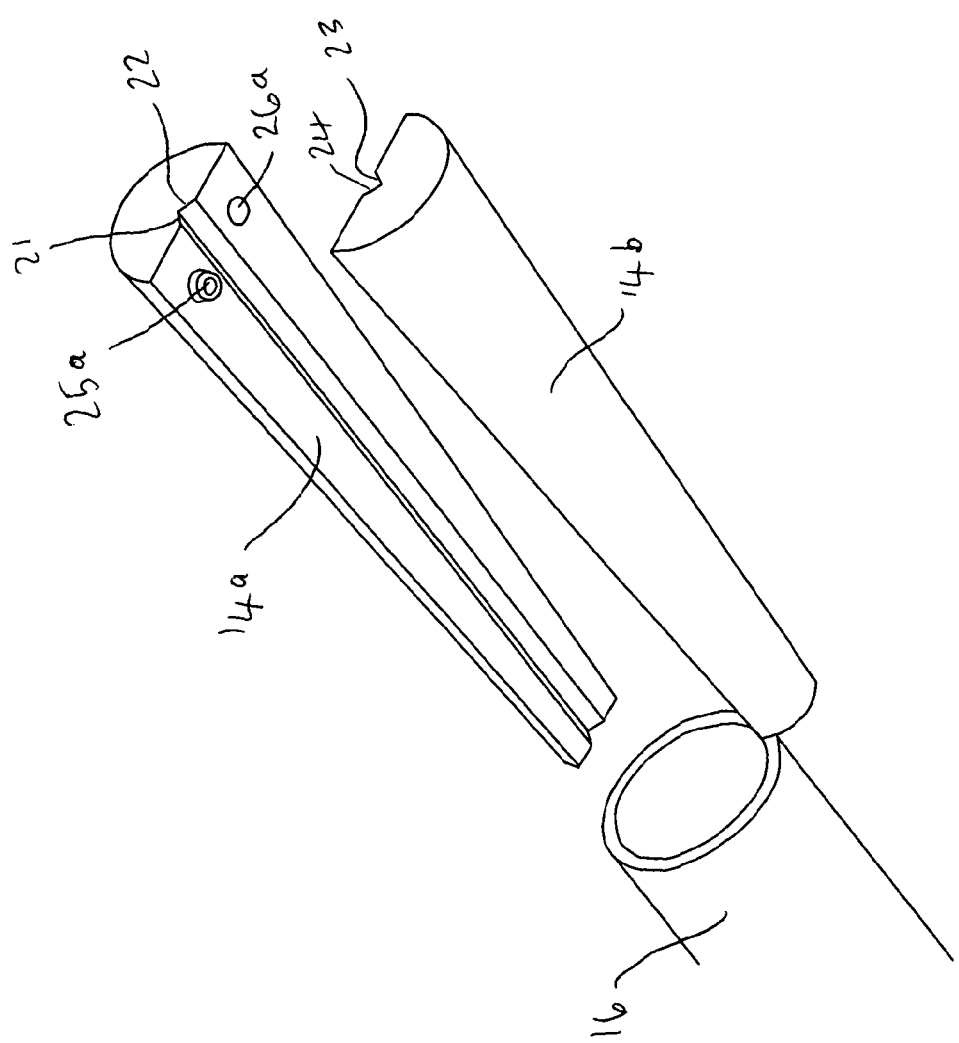
FIG. 3 is a perspective view of cone halves and an outer body of the termination of FIG. 1 taken from a position below the cone halves and the outer body.
Figure 4:
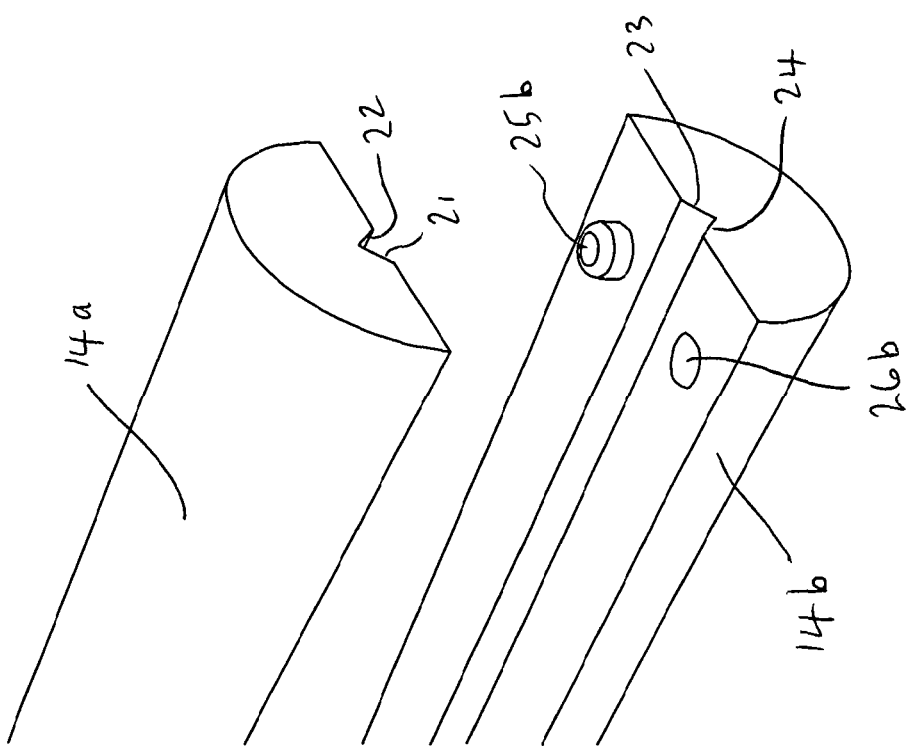
FIG. 4 is a perspective view of cone halves of the termination of FIG. 1 taken from a position above the cone halves.

The termination 10 comprises an inner gripping body 14 in the form of two cone halves 14a, 14b, an outer body in the form of a sleeve 16 with a conical inner surface 17, and a housing 18. As illustrated in FIG. 2 of the drawings, the cone halves 14a, 14b define a square-section passage 20, each cone half 14a, 14b having two mutually perpendicular faces 21, 22 and 23, 24 respectively defining two sides of the passage 20. As shown most clearly in FIGS. 3 and 4, each of the cone halves 14a, 14b is fitted with a respective dowel pin 25a, 25b which is configured to engage a respective socket 26b, 26a formed in the other cone half 14b, 14a. Such a dowel pin and socket arrangement permits separation of the cone halves 14b, 14a to allow the member 12 to be placed in the passage 20 and serves to align the cone halves 14a, 14b co-axially when the cone halves 14a, 14b are placed directly together as shown in FIGS. 1 and 2. When the cone halves 14a, 14b are placed directly together, the opposing faces 21, 23 and 22, 24 are spaced apart by a distance d which is 78.5% of the outer diameter D of the member 12 and the perimeter of the passage 20 is substantially equal to the circumference of the member 12. In the illustrated embodiment the faces 20, 22 and 21, 23 are spaced 3.93 mm apart, and the member 12 has a diameter of 5 mm.

The inner body 14 is 140 mm long, the smaller end of the body 14 having a diameter of 15 mm and the larger end a diameter of 30 mm. The body 14, sleeve 16 and housing 18 are formed of any appropriate material, and may be of metallic or composite construction. The elastic modulus and other material properties of the cone halves 14a, 14b may be selected to match the material properties of the elastic member 12 and the anticipated operating parameters of the member 12 and termination 10.

In use, to secure the termination 10 on the member 12, the cone halves 14a, 14b are removed from the sleeve 16 and the free end of the member 12 passed through the opening 30 in the housing 18 and placed in the passage 20 between the cone halves 14a, 14b. The cone halves 14a, 14b are placed directly together so that the dowel pins 25a, 25b engage the respective sockets 26b, 26a for the co-axial alignment of the cone halves 14a, 14b. The cone halves 14a, 14b are then pressed into the sleeve 16, such that the sleeve inner surface 17 forces the cone halves 14a, 14b together, clamping the member 12 in the passage 20. The circular member 112 is deformed to assume the square form of the passage 20. The engaging surfaces of the cone halves and the sleeve act as a taper lock, securing the cone halves 14a, 14b in the sleeve 16. The sleeve 16 is then located in the housing 18.

The housing may include mechanical fixings or fittings to permit the housing 18, and thus the end of the member 12, to be fixed to a tool, device or other object.

Where the member 12 includes one or more of an electrical, optical or fluid conductor, typically centrally embedded in the member 12, the conductor may extend through the passage 20 with the remainder of the member 12, and exit the passage 20 at the larger diameter end of the inner body 14. The conductor may then be separated from the remainder of the member 12 and terminated in an appropriate manner within the housing 18.

The termination 10 thus allows the member 12 to be terminated without requiring bending of the member 12. The member 12 is substantially incompressible, but the degree of compliance of the member 12 allows the member to be deformed and engage the walls of the passage. The termination 10 is configured with reference to Poisson's ratio as it relates to the member 12, that is the ratio, in the elastic elongate member 12, of the transverse strain to the longitudinal strain. In a typical application the member 12 will experience a varying tensile load, for example between zero and 4,500 kg, and at maximum load the member may experience 2-3% elongation. This elongation may be accompanied by a slight reduction in cross section, and the termination 10 is configured to grip or clamp the elongate member 12 sufficiently tightly such that the member 12 will remain securely retained in the termination 10 under maximum load even when this is accompanied by a tendency for the cross section of the member 12 to reduce.

The form of the termination 10 is such that the termination 10 and elongate member 12 may be made-up quickly and securely in the field using only mechanical means.

The above embodiment relates to a circular elongate member being clamped within a square passage. In other embodiments alternative forms of elongate member may be utilised, for example oval or polygonal elongate members. Similarly, alternative passage forms may be utilised, for example oval, circular or hexagonal.

Also, if provided with a sleeve 16 and housing 18 which are in two parts, it would be possible to mount the termination 10 on an intermediate portion of the elongate member 12.

The invention claimed is:

1. An elongate member assembly, comprising a substantially circular cross section elongate member comprising a plurality of elongate fibres in a matrix and a termination comprising a gripping member comprising two halves together defining a square cross section passage for receiving a portion of the elongate member, each half of the gripping member having two mutually perpendicular faces defining two sides of the passage, wherein the halves are configured such that, when the halves are placed directly together, the opposing faces of the passage are spaced apart by a distance which is 70-95% of the outer diameter of the elongate member.

2. The assembly of claim 1, wherein the elongate member is compliant.

3. The assembly of claim 1, wherein the passage is configured to define a clamping dimension in which the distance between opposing faces of the passage is smaller than the diameter of the elongate member.

4. The assembly of claim 1, wherein the halves are configured such that, when the halves are placed directly together, the opposing faces of the passages are spaced apart by a distance which is 75-85% of the outer diameter of the elongate member.

5. The assembly of claim 1, wherein a perimeter of the passage is substantially equal to a circumference of the elongate member.

6. The assembly of claim 1, wherein the gripping member is configured to be received by an outer member, the gripping member and the outer member being configured such that location of the gripping member in the outer member tends to cause the dimension of the passage to reduce.

7. The assembly of claim 6, wherein the gripping member and the outer member define co-operating frusto-conical surfaces.

8. The assembly of claim 6, wherein an outer surface of the gripping member and an inner surface of the outer member define a taper lock.

9. The assembly of claim 1, wherein the termination is configured to accommodate a reduction in cross-section of the elongate member so as to maintain a grip on the elongate member when the elongate member extends longitudinally under tension.

10. The assembly of claim 1, wherein the elongate member is substantially incompressible and is sufficiently compliant to allow the elongate member to be deformed and engage the walls of the non-circular cross-section passage.

11. The assembly of claim 1, wherein the elongate member primarily comprises non-metallic fibres set in a compliant matrix.

* * * * *